July 21, 1959  H. J. PARSONS ET AL  2,895,740

FEED CHUCKS

Filed March 13, 1958

United States Patent Office 2,895,740
Patented July 21, 1959

2,895,740

FEED CHUCKS

Hubert J. Parsons, Horseheads, and Anders Adolf Peterson, Elmira, N.Y., assignors to Hardinge Brothers, Inc., Elmira, N.Y.

Application March 13, 1958, Serial No. 721,118

8 Claims. (Cl. 279—41)

This invention relates to improvements in feed chucks or feed fingers of the kind commonly used for advancing the work or stock in automatic screw machines, lathes or the like, such for example as shown in the Peterson application for patent Serial Number 531,896 filed September 1, 1955, Patent Number 2,845,274.

In the use of feed chucks of this type in which the work which is being fed is yieldingly gripped by the springs or fingers of the feed chuck, the advancing of the work is sometimes interfered with when the work is in the form of long bars or rods which may vibrate or "whip" considerably while being rotated. This has required the use of heavier springs or greater tension of the springs or fingers, but this resulted in more marking of the stock and more breakage of the fingers since the stronger spring fingers fatigue much faster. The stock gripping surfaces of the feed chuck also wear much faster due to increased pressures.

It has also been found that the feeding of bars or rods between the stock gripping parts of the feed chucks is apt to be damaging to these parts if the entering end of the bar or rod is not approximately concentric with relation to the feed fingers. Furthermore when working on a bar or rod of a cross-section other than circular, such bar may be inserted into the feed chuck with the corner portions of the end of the bar striking against a part of a work gripping surface which is intended to engage a flat part of the bar, in which case breaking of the stock engaging parts of the feed chuck is very apt to result.

It is consequently an object of this invention to provide feed chucks with guide means for the bar stock which engages the bar before it is advanced to the stock-gripping parts of the feed chucks and which reduces the transmission of vibrations and movements of the bar stock to the gripping parts. It is a further object of this invention to provide guide means of this type which can be readily removed from a feed chuck and replaced by other guide means for various sizes and shapes of bar stock.

Figure 1:
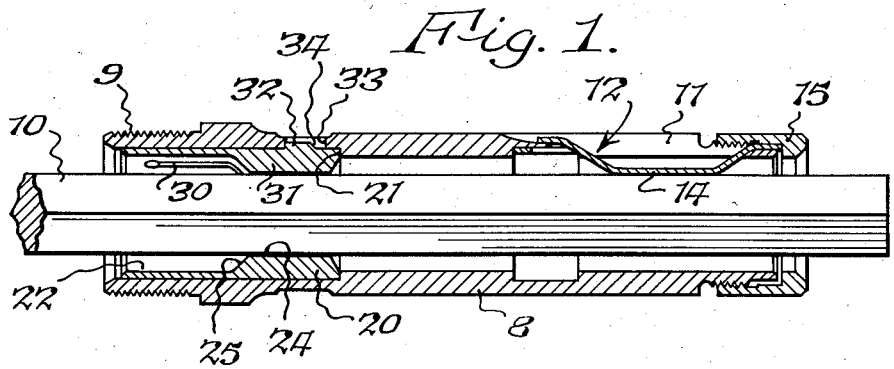
Fig. 1 is a longitudinal, central sectional elevation of a feed chuck embodying this invention showing a bar stock held thereby.

While our improvements are herein shown as used in connection with a feed chuck of the type shown in said Peterson patent, it will be obvious that it is not intended to limit the use of our improvements in connection with this feed chuck, since our improvements are equally applicable to feed chucks having different types of stock engaging faces.

In the construction shown, by way of example, 8 represents the tubular body portion of the feed chuck which is provided at the back or work receiving end thereof with an externally threaded part 9 formed for threaded engagement with the usual feed tube (not shown) of a screw machine or lathe and which is advanced in the direction of its axis whenever the work or stock is to be fed forwardly. 10 represents a piece of stock with which our improved feed chuck may cooperate.

The body member 8 of the feed chuck is provided at intervals about the periphery of the same with longitudinally extending slots or cut-out portions 11 arranged intermediate of the ends of the body member but preferably adjacent to the discharge end thereof. Any desired number of these slots may be provided, three being shown in the construction illustrated. 12 represents springs or pads mounted on the body member and having their ends arranged in the slots 11, the springs being bowed inwardly so that the middle portions 14 thereof extend toward the axis of the body in position to engage the stock. The extent to which the middle portions of the spring are formed to extend toward the axis of the body member depends on the diameter of the stock to be fed. The springs may be secured to the body member in any suitable or desired manner, the springs shown each being provided at one end thereof with means for engaging with the body portion in the ends of the slots therein and the other ends of the springs are engaged by means of a shouldered sleeve or cap 15 which has a threaded engagement with the body portion and thus enables these sleeves or caps to adjust the outer ends of the springs toward and from the inner ends thereof to move the middle portion 14 toward and from the axis of the body portion to cooperate with stock of slightly different sizes and to vary the pressure with which the springs engage the stock.

In order to guide the stock during the insertion of the same into the feed chuck and to oppose the transmission of vibrations or movements of the stock to the springs 12 or other stock gripping parts of the feed chucks, we have provided at the inner ends or receiving portion of the body member a bushing or sleeve 20. This bushing is formed to fit within the stock receiving end of the chuck and preferably the interior diameter of that portion of the body member which receives the bushing is made of slightly larger internal diameter than other parts of the body member thus forming an annular shoulder 21 with which the forward end of the bushing may engage when the bushing is in its operative position. The bushing has an internal stock receiving portion 22 which is of larger internal diameter than the outer diameter of the stock so that the stock can be readily entered into the receiving end of the body member. Preferably the receiving end of the body member and also of the bushing 20 are of slightly conical form to assist in guiding the stock into the enlarged receiving portion 22.

Figure 2:
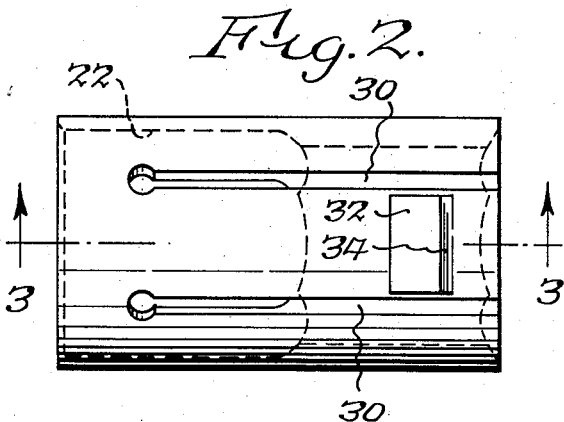
Fig. 2 is an enlarged elevation of a bushing used in connection with feed chucks for guiding the bar stock to the gripping parts thereof.
Figure 3:
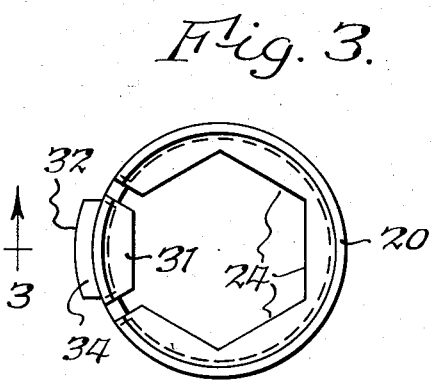
Fig. 3 is an end elevation thereof.
Figure 4:
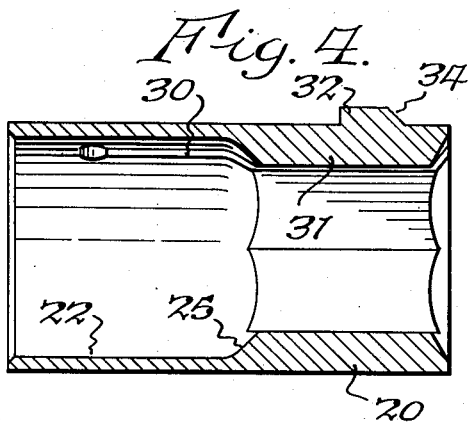
Fig. 4 is a transverse section thereof on line 3—3, Fig. 2.
Figure 5:
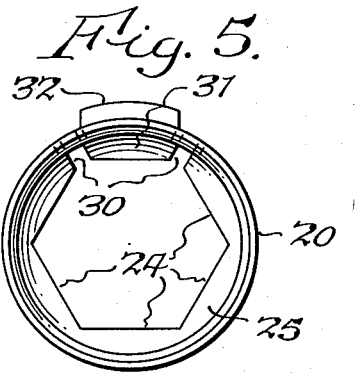
Fig. 5 is an end view of the bushing seen from the end opposite to that shown in Fig. 3.

The bushing also has an inner portion or bore 24 of smaller diameter than the portion 22 and which is formed for a sliding fit with the stock. A substantially conical or tapering portion 25 serves to guide the stock into the portion 24 of smaller diameter. The portion or bore 24 is shaped according to the stock to be fed and may be of square cross-section when cooperating with stock of square cross-section, or hexagonal as shown in Figs. 1–5 when cooperating with hexagonal bars or rods, or the bore or part 24 may be of circular or other cross sectional shape.

In order to hold the bushing removably in the body portion of the feed chuck, we have provided a latch or spring-urged detent formed to interlock with a portion of the body member. In the construction shown for this purpose the bushing is provided with a pair of longitudinally extending slots 30 spaced from each other and terminating adjacent to the inner or stock-receiving end if the bushing. These slots consequently form between them a spring latch 31, and this latch is preferably provided with a detent 32. The body member is also formed with a hole 33 therein shaped to receive the detent 32. Consequently, when the bushing is inserted into the inner end of the body portion, the spring latch 31 is first depressed inwardly with reference to the bushing, this inward movement of the latch being facilitated by the inclined surface 34 formed on the detent. The other end of the detent is provided with a substantially square shoulder formed to engage with a square shoulder on the inner end of the hole 33, so that the bushing will be securely held against movement out of the body portion. Further movement into the body portion is opposed by the shoulder 21. Consequently, the bushing will be securely held in place but may be removed by pressing the free end of the latch inwardly into the bushing and then prying the bushing outwardly. The hole 33 in the body portion of the feed finger is of a width very slightly in excess of the detent 32 so that the bushing will also be held against turning about the axis of the body portion.

When the inner surface 24 of the bushing is of other than circular form, the hole 33 is accurately located with reference to the stock-gripping faces of the feed chuck so that when the bushing is correctly located within the body portion, then when non-circular stock is inserted through the bushing it will be located in correct relation to the stock-gripping parts of the feed chuck. For example, if the stock has flat faces, as shown in the drawings, this stock will be so positioned with reference to the feed chuck that only flat faces of this stock will move into engagement with correspondingly shaped stock-gripping portions of the feed chuck. It will be noted that the bushing is very securely held in the body portion when stock extends through the same since the stock will prevent inward movement of the latch 31.

The advantages of the stock guide means or bushing will be obvious. In modern screw machines and lathes the speeds have been greatly increased over former machines of these types and consequently when relatively long rods or bars of stock are being worked on, the portions of this stock which extend beyond the feed chuck are subject to vibrations or "shipping." Without the bushing or guide means, this resulted in movement of the stock between the stock-gripping parts or springs 12 so that the correct feeding of the stock by means of the feed finger frequently could not be relied upon. It was consequently attempted to rectify this situation by greatly increasing the pressure of the springs or stock-gripping members of the chuck against the stock which, of course, had the disadvantages that the stock-gripping members were apt to mark or score the stock, and also rapid wearing of the stock-gripping parts of the feed chuck resulted. As the result of using the stock guide means or bushing at the back end of the body member, the portion of the stock between the guide bushing and the stock-gripping members of the feed chuck is held substantially against movement. This greatly facilitates the correct feeding of the stock and also makes it possible to reduce the pressure of the springs in the feed chuck. Consequently the scoring or other damage to the stock is greatly reduced, the life of the stock-gripping members of the feed chuck is greatly increased, and the short feeding out of bars is eliminated.

The bushing has the further action that it tends to hold the portions of the bar extending backwardly from the feed chuck more nearly coaxial with the chuck. When operating on stock of soft metal, such as aluminum or brass, the bushing greatly reduces the tendency of stock to "kink" when running at high speed. The bushing arranged as shown also prevents breaking of the feed chuck due to twisting action of hexagonal or square stock.

The bushing also reduces the pressure required of the work gripping faces of the feed chuck against the stock in that the bushing itself adds push to the stock because of frictional contact with the stock. This push of the bushing increases with the speed of the spindle. On hexagonal or square stock this assisting friction is even greater than with round stock because the twisting or torque on the stock produces pressure against the flat faces of the bushing, thus further reducing the tendency of the feed chuck to score the work.

In addition to these advantages it is also obvious that when the stock is correctly fed to pass through the bushing 20, any flat faces of the stock will be alined with the corresponding flat stock-engaging portions of the feed chuck. Consequently damage resulting from having a corner portion of the entering end of the stock forced against a stock-gripping part which is intended to cooperate with a flat face of the stock is entirely avoided.

The construction of bushing is such that it can be very easily removed from the body portion of the feed chuck. The bushings are of relatively simple construction so that they do not add materially to the cost of the feed chucks.

When using a bushing as described on stock of hexagonal cross-section, another advantage results in that the stock is supported on six sides, whereas the stock engaging parts of the chuck engage only three sides or faces of the stock.

It will be understood that various changes in the details, materials and arrangements of parts, which have been herein described and illustrated in order to explain the nature of the invention, may be made by those skilled in the art, within the principle and scope of the invention, as expressed in the appended claims.

We claim:

1. A feed chuck including a tubular body member having work gripping parts adjacent to one end thereof and yieldingly pressed against the work, a bushing in said body member at the other end thereof to absorb radial and torsional forces exerted by the work and oppose transmission of the same to said work gripping parts, said bushing having a bore of cross-sectional shape forming a sliding fit with the stock to be fed by said feed chuck, and means for removably locking said bushing in said body member.

2. A feed chuck according to claim 1 in which said bushing has a bore of larger diameter located rearwardly from said first mentioned bore for guiding work into said first mentioned bore.

3. A feed chuck according to claim 1 in which said locking means include a latch releasably engaging said body member for holding said bushing in operative relation to said chuck.

4. A feed chuck according to claim 1 in which said locking means include a latch releasably engaging said body member for holding said bushing in operative relation to said chuck, said latch being movable into said bushing for releasing the same from said body tube and being held against movement into releasing position by the work when the same is in said bushing.

5. A bushing for use in a feed chuck, said bushing being of cylindrical form and having two slits extending lengthwise therein in closely spaced relation to each other and extending from one end thereof into proximity to the other end and forming between them a latch for cooperation with said chuck to lock said bushing in said chuck.

6. A bushing for use in a feed chuck, said bushing being of cylindrical form and having two slits extending lengthwise therein in closely spaced relation to each other and extending from one end thereof into proximity to the other end and forming between them a latch for cooperation with said chuck to lock said bushing in said chuck, and a detent projecting outwardly from said latch, said feed chuck having an opening therein into which said detent is moved by said latch when said bushing is in its operative position in said feed chuck.

7. A feed chuck including a tubular body member having work-gripping parts adjacent to one end thereof and yieldingly urged inwardly and having flat faces formed to engage against corresponding flat faces of the work, a bushing in said body member at the other end thereof and having a bore of cross sectional shape forming a sliding fit with the stock to be fed by said feed chuck and having a flat face in said bore formed to engage a flat face of the work, and means for removably locking said bushing in said body member with the flat face of the bushing arranged in the same plane as a flat face of the work-gripping part.

8. A feed chuck including a tubular body member having work-gripping parts adjacent to one end thereof and yieldingly urged inwardly and having flat faces formed to engage against correspondingly flat faces of the work, a bushing in said body member at the other end thereof and having a bore of cross sectional shape forming a sliding fit with the stock to be fed by said feed chuck and having a flat face in said bore formed to engage a flat face of the work, said bushing having an integrally formed latch provided with a detent projecting outwardly therefrom, said body member having an opening into which said detent may enter for holding said bushing in said body member, said opening in said body member and said detent being arranged in positions to support a flat face of said bushing in the same plane as a flat face of said work-gripping parts.

References Cited in the file of this patent

UNITED STATES PATENTS

| | | |
|---|---|---|
| 1,873,922 | Bacigalupi | Aug. 23, 1932 |
| 2,037,304 | Baxendale | Apr. 14, 1936 |
| 2,263,808 | Hutchinson | Nov. 25, 1941 |
| 2,398,924 | Daniels | Apr. 23, 1946 |